May 28, 1957   S. ROHOWETZ   2,793,478
CUTTING TOOL AND METHOD OF MAKING
Filed May 24, 1954
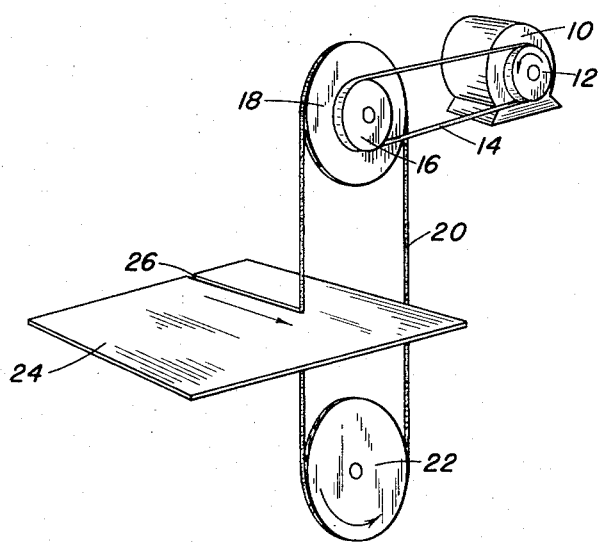
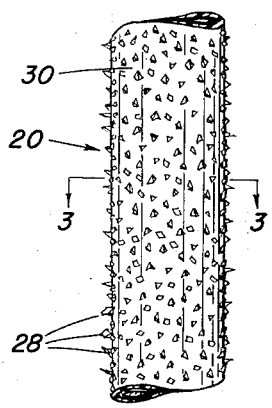
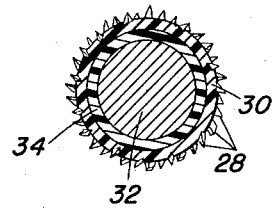
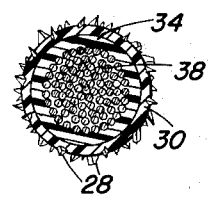
INVENTOR.
STANLEY ROHOWETZ
BY
*Paul L. Ahern*
Attorney United States Patent Office 2,793,478
Patented May 28, 1957

2,793,478

CUTTING TOOL AND METHOD OF MAKING

Stanley Rohowetz, Madison, Wis., assignor to Bjorksten Research Laboratories, Inc., Madison, Wis., a corporation of Illinois Application May 24, 1954, Serial No. 431,954

16 Claims. (Cl. 51—188)

This invention relates to a novel cutting tool and more particularly to a cutting tool which has an abrasive surface on all exposures. The invention also relates to methods for making such a cutting tool.

With the extensive use in recent years of such materials as glass fiber laminates and the like which are very difficult to cut with conventional tools, there is a widespread need for new cutting tools capable of cutting such materials. New steels, brass and other alloys are also in this class of materials for which new cutting tools are needed. The need is especially great in the case of glass fiber laminates which are to be cut into irregular or curved shapes.

It is therefore a principal object of this invention to provide a cutting tool which will function satisfactorily with the new, tougher glass fiber laminates and laminates which contain glass in any form.

Another object of the invention is to provide a cutting tool which can be adapted for use on portable or stationary high speed equipment.

A further object of the invention is to provide a cutting tool for extremely tough materials such as glass fiber laminates which will cut such materials into irregular or curved shapes.

Still another object of the invention is to provide a practical method for making a cutting tool that will cut very tough materials.

These and other objects and advantages of the invention will become more apparent upon a careful consideration of the following description of the invention taken in cooperation with the accompanying drawings in which:

Fig. 1 is a schematic view of one embodiment of a continuous cutting tool according to the invention, in operation;

Fig. 2 is a plan view of one embodiment of the invention enlarged many times;

Fig. 3 is a sectional view of the cutting tool illustrated in Fig. 2 and taken along the lines 3—3 of Fig. 2; and Fig. 4 is a sectional view of another embodiment of the cutting tool of this invention.

In the accomplishment of the foregoing objects and in accordance with the practice of the invention there is now provided a novel cutting tool which comprises a non-planar core consisting of a strong, hard material, a layer of resinous material adhering to said core, and particles of an abrasive material bonded to said resinous material.

The core is preferably a rod-like material such as a steel wire or rod, or a wire or rod made of iron, stainless steel, nickel, aluminum, brass, glass fiber, or any other suitable material which is strong, flexible and resilient such as nylon or rubber. The core may be a single strand or rod or it may consist of a twisted or woven group of rods, strands or wires. The core should be flexible so that the cutting tool may be readily adapted to use on high speed continuous tools such as a bandsaw type of machine.

A primary bonding adhesive or thermoplastic interlayer is preferably used as the first layer about the core. Polymers characterized by the vinyl type of polymerization mechanism are especially suitable, i. e. those polymers wherein polymerization takes place through ethylenic linkages. Other suitable materials include nylon type resins, acrylates, the epoxy resins (resins based on ethylene oxide or its homologs or derivatives and made by condensation of epichlorohydrin with a bisphenol, ethylene glycol or glycerol) or combinations of these resins with each other and with the vinyl type resins previously described. Plasticizers may be added according to best practice in the art. The primary bonding adhesive is suitably applied from solvent solution and is dried in a conventional manner.

Usually it will be desirable to prepare the surface of the core material so that the primary bonding adhesive will form the best type of permanent bond therewith. In the case of the metals this is accomplished by acid or alkaline pretreating.

It may also be desirable in some instances to eliminate or modify the thermoplastic primary bonding resin in order to provide improved temperature resistance in the completed cutting tool. Hence, the invention also includes the use of thermoplastic resin systems in which are included compatible thermosetting resins. Among such systems are included combinations of a polymer or polymers characterized by the vinyl type of polymerization mechanism, i. e. those polymers where polymerization takes place through ethylenic linkages, such as, for instance, polyvinyl butyral, with a phenol-formaldehyde resin. Other suitable systems include the combination of an acrylic resin with a phenolic resin and the combination of a silane resin and a phenolic resin. The systems and combinations provide increased heat resistance over the thermoplastic resins alone.

It may be desirable in instances where the cutting tool is expected to withstand very high cutting temperatures to use a thermosetting resin system as the primary bonding material. One such representative system includes the combination of a silane resin with an alkyd resin wherein the system is adhesive to metals such as the steel wire of the core of the cutting tool.

The secondary bonding resin or thermosetting resin layer may consist of any thermosetting resin that sets to a hard or tough surface. Representative of this class are phenol-formaldehyde resins, resorcinol-formaldehydes, aniline-formaldehydes, coumarine-indene, polyester, silane and alkyd resins.

It will be understood that the secondary bonding resin or thermosetting resin will be applied to the surface of the primary bonding resin or thermoplastic interlayer and will form a practically indestructible bond therewith. The abrasive material is dusted or sprayed over the surface of the thermosetting resin prior to the curing of the resin by conventional methods. A preferred thermosetting resin and method for applying it will appear in detail in the description to follow.

Referring now to the drawings in full detail, the schematic diagram in Fig. 1 shows a very simple type of bandsaw installation in which a motor 10 is used to drive a pulley 12 which is attached by means of the belt 14 to a second pulley 16. This pulley 16 is connected by a common shaft to the grooved drive wheel 18 over which the abrasive wire 20 is adapted to be driven. The wire 20 is coated in accordance with this invention with a uniformly distributed outer layer of abrasive or gritty particles or granules (see Fig. 2). The wheel 22 is a guide and tension member adapted to carry the wire 20. The numeral 24 designates a sheet of laminated glass fiber and the groove 26 represents the cut already made in the sheet 24 by the abrasive wire 20.

In Fig. 2 the greatly enlarged abrasive wire 20 is illustrated as having a large number of abrasive or gritty particles 28 imbedded in or adhering to a layer of thermoset resin 30. The abrasive particles may be any of the known abrasives such as carborundum, alumina, garnet, diamond, pumice and the like.

The core 32 in Fig. 3 is illustrated as being of steel but it will be understood that any of the core materials already mentioned may be employed instead. Surrounding the core 32 and securely bonded thereto is a layer 34 of thermoplastic, adhesive, resinous material such as polyvinyl butyral or one of the other primary bonding adhesives previously named. Adhering strongly to the layer 34 is a layer 30 of thermosetting resin and imbedded in the layer 30 is a large number of abrasive particles 28.

Fig. 4 differs from Fig. 3 mainly in having a core made up of a number of woven or twisted strands of metal or glass fiber. Such a core may have advantages of increased strength and flexibility over a single strand.

In one specific embodiment of the invention a steel wire is acid pretreated and then coated with one of the following formulae or polyvinyl butyral in solvent:

Wash primer

| | Parts |
|---|---|
| Vinylite resin XYHL | 9.0 |
| Zinc chromate pigment | 7.0 |
| Phosphoric acid 85% | 4.0 |
| Water | 3.0 |
| Isopropyl alcohol | 65.0 |
| Toluene | 12.0 |

Primer

| | Parts |
|---|---|
| Vinylite resin XYSG | 10.0 |
| Bakelite resin varnish BU-9700 | 20.0 |
| Zinc chromate | 15.0 |
| Glyoxal | 1.0 |
| Dibutyl sebacate | 1.0 |
| Water | 2.0 |
| Synasol solvent | 4.0 |
| Butanol | 7.0 |
| Isopropanol | 20.0 |
| Hydrocarbon solvent | 20.0 |

The resin coating thus applied is dried in a conventional manner.

A heavy coating of a phenol-formaldehyde (A-stage) resin is applied over the primary resin coat by drawing the wire through a viscous solution of the resin. The amount of resin applied may be controlled by adjusting the viscosity of the resin solution or by the rate at which the wire is drawn through the resin. The abrasive grit is next applied to the surafce of the resin which has adhered to the wire by air-blasting or by gravity dusting. The abrasive is applied in an amount and in a manner to form a uniform deposit around the resin coated wire.

The abrasive coated wire is now warmed to cure the phenol-formaldehyde resin to the B stage (gel stage). A second coating of same or similar resin (size coat) is now applied by spraying or immersion techniques and a lower viscosity resin solution is used. The coated wire is now completely cured so that the bonding resin is thermoset in the C stage. When cured the thermosetting resin is firmly and permanently bonded to the thermoplastic adhesive which in turn firmly adheres to the wire. The abrasive particles are firmly and permanently bonded or set in the thermosetting resin.

This wire is capable of cutting on all sides, of conducting excess heat away from the cutting area and of furnishing far more cutting edges than found on band or tooth saws.

Others may practice this invention in any of the numerous ways which will be suggested by this disclosure to one skilled in the art. All such practice is considered to be a part of this invention, provided, however that it falls within the scope of the appended claims.

I claim:

1. A cutting tool which comprises a core consisting of a flexible metal wire, a layer of flexible, thermosetting resinous material permanently bonded to said core, and particles of abrasive material permanently imbedded in said resinous material.

2. A cutting tool which comprises a core consisting of a flexible metal wire, a layer of adhesive, thermoplastic resin adhering to said core, a layer of thermosetting resin permanently bonded to said thermoplastic layer, and particles of abrasive material permanently imbedded in said thermosetting layer.

3. The cutting tool of claim 2 wherein said core is steel wire.

4. The cutting tool of claim 2 wherein said particles of abrasive material are silicon carbide.

5. The cutting tool of claim 2 wherein said thermoplastic resin is polyvinyl butyral.

6. The cutting tool of claim 2 wherein the thermosetting resin is a phenol-formaldehyde resin.

7. A cutting tool which comprises a flexible core consisting of a metal wire, a layer of a primary bonding resin characterized by polymerization through ethylenic linkages, said layer adhering firmly to said core, a layer of thermosetting resin permanently bonded to the first layer, and particles of abrasive material permanently imbedded in said thermosetting layer.

8. A cutting tool which comprises a flexible core consisting of a metal wire, a layer of adhesive, thermoplastic resin adhering firmly to said core, a secondary bonding layer of a thermosetting resin reaction product of formaldehyde with a member of the class consisting of phenol, resorcinol and aniline permanently bonded to said thermoplastic layer, and particles of abrasive material permanently imbedded in said thermosetting resin.

9. A cutting tool which comprises a flexible core consisting of a metal wire, a layer of a primary bonding resin characterized by polymerization through ethylenic linkages, said layer adhering firmly to said core, a secondary bonding layer of a thermosetting resin reaction product of formaldehyde with a member of the class consisting of phenol, resorcinol and aniline permanently bonded to said thermoplastic layer, and particles of abrasive material permanently imbedded in said thermosetting resin.

10. The method of making a cutting tool which comprises coating a flexible wire with a layer of an adhesive thermosetting resin, depositing a uniform layer of abrasive material on said resin, and curing said resin thereby to permanently bond said abrasive material thereto.

11. The method of making a cutting tool which comprises coating a flexible wire with a first layer of an adhesive, thermoplastic resinous material, coating said first layer with a second layer of a thermosetting resin, depositing a uniform layer of abrasive material on said second layer, and setting said second layer thereby to permanently bond said abrasive material and said first layer thereto.

12. The method of making a cutting tool which comprises coating a steel wire with a first layer of polyvinyl butyral, coating said first layer with a second layer of a fluid phenol-formaldehyde thermosetting resin, depositing a uniform layer of abrasive material on said second layer, and curing said second layer thereby to permanently bond said abrasive material and said first layer thereto.

13. A cutting tool which comprises flexible, non-planar core means, a first layer of primary bonding resin adhering to said core means, a second layer of thermosetting resin bonded to said first layer, and particles of abrasive material permanently imbedded in said second layer.

14. A cutting tool which comprises flexible, non-planar core means, a first layer of primary bonding thermosetting resin adhering to said core means, a second layer of thermosetting resin bonded to said first layer, and particles of abrasive material permanently imbedded in said second layer.

15. A cutting tool which comprises a core consisting of a flexible metal wire, a first layer of primary bonding thermosetting resin adhering to said core, a second layer of thermosetting resin bonded to said first layer, and particles of abrasive material permanently imbedded in said second layer.

16. A cutting tool which comprises flexible, non-planar core means, a layer of adhesive, thermoplastic resin adhering to said core means, a layer of thermosetting resin permanently bonded to said thermoplastic layer, and particles of abrasive material permanently imbedded in said thermosetting layer.

References Cited in the file of this patent

UNITED STATES PATENTS

| | | |
|---|---|---|
| 63,341 | Trant | Mar. 26, 1867 |
| 604,569 | Ringstrom | May 24, 1898 |
| 2,328,998 | Radford | Sept. 7, 1943 |
| 2,347,662 | Carlton et al. | May 2, 1944 |

FOREIGN PATENTS

| | | |
|---|---|---|
| 13,417 | Great Britain | 1900 |